Dec. 8, 1964 D. O. APPLEBY 3,159,858
SET OF HIGH SPEED THREAD CUTTING CARBIDE CHASERS
Filed Nov. 1, 1962 4 Sheets-Sheet 1

INVENTOR.
Donald O. Appleby,
BY
his ATTORNEY.

Dec. 8, 1964   D. O. APPLEBY   3,159,858
SET OF HIGH SPEED THREAD CUTTING CARBIDE CHASERS
Filed Nov. 1, 1962   4 Sheets-Sheet 3

INVENTOR.
Donald O. Appleby,
BY
His ATTORNEY.

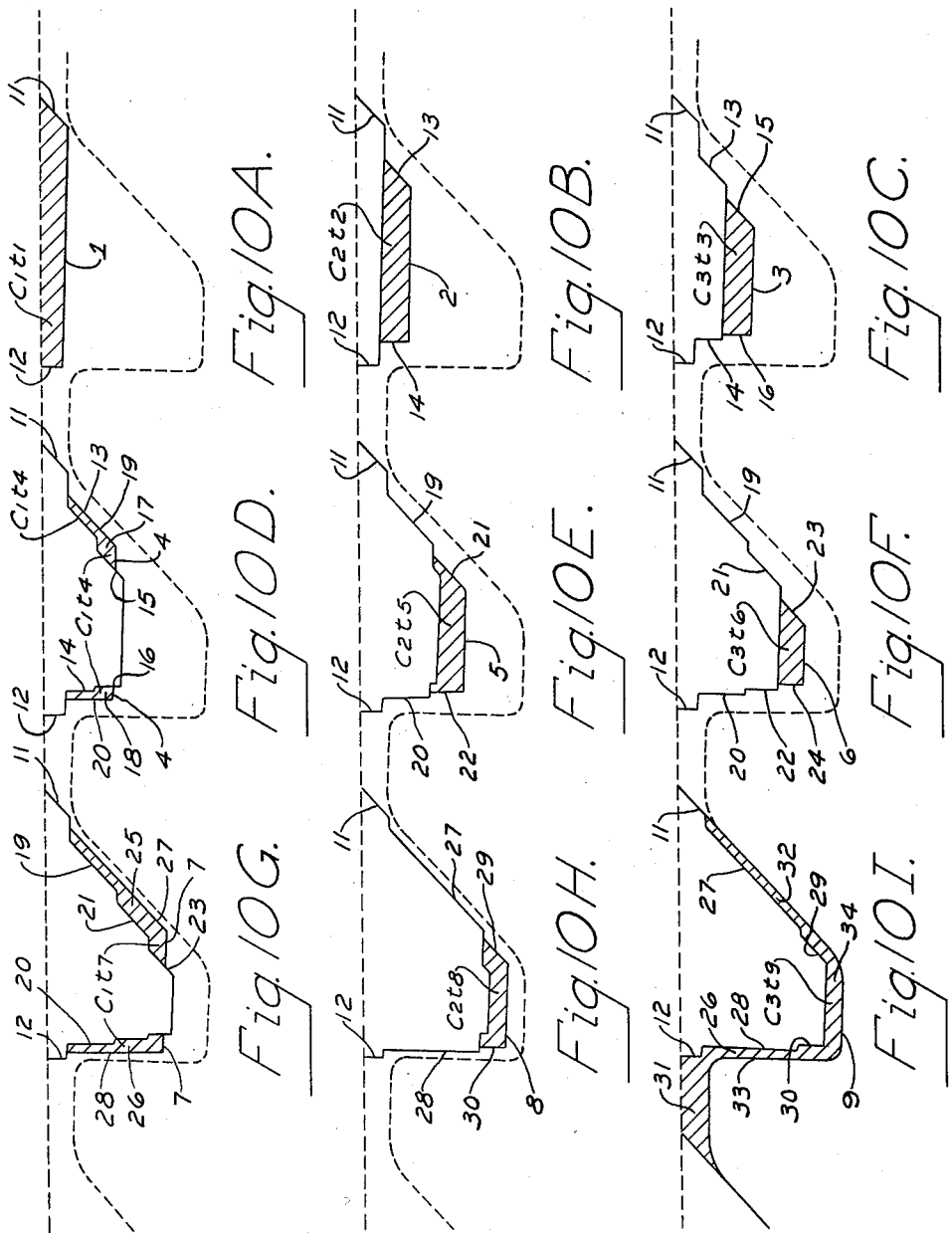

United States Patent Office 3,159,858
Patented Dec. 8, 1964

3,159,858
SET OF HIGH SPEED THREAD CUTTING
CARBIDE CHASERS
Donald O. Appleby, Mentor, Ohio, assignor to The Pipe
Machinery Company, Wickliffe, Ohio, a corporation of
Ohio
Filed Nov. 1, 1962, Ser. No. 234,753
1 Claim. (Cl. 10—111)

This invention relates to carbide chasers, and particularly to the set of high speed thread cutting carbide chasers which are arranged to be mounted in a rotary spindle head and rotated concurrently about a common axis to cut a cylindrical or tapered thread.

The present invention relates to a set of chasers which, when co-rotated, make a plurality of sets of successive central cuts progressively nearer to the finished thread root line and with their flank ends in steps progressively farther from the finished tooth flank lines, each set being followed by at least one flank cut, the flank cuts being successively progressively nearer to the finished flank lines, respectively, and the flank cuts preceding the finish flank cut being interrupted at the root made by the central cut immediately preceding it. In the cross section of the thread, both flank ends of the central cut of the central cut are inset in a direction axially of the thread from the flank ends of the next preceding central cut adjacent to it so that the flank ends of the cuts are in inwardly stepped relation to each other.

The principal objects of the present invention are to reduce the shear lines, the resultant chip loads of the individual teeth, to prorate the cutting load more effectively among the teeth, to eliminate rubbing by any tooth of surface of the workpiece exposed by cuts made by a preceding tooth, and to provide ample space for the chips so that they can be flushed out readily by coolant and prevented from packing, thereby reducing tooth load and admitting coolant more effectively to the chaser teeth.

Other objects and advantages will become apparent from the following description wherein reference is made to the drawings, in which:

FIGS. 10A through 10I are diagrammatic illustrations of cross sections of the thread showing, in order, the successive cuts made by the teeth of the chasers of FIGS. 3 through 8.

For purposes of illustration, the chasers are shown with tooth profiles for cutting a butt thread having a 45° forward flank angle and a 0° rear flank angle, their application to other thread profiles being apparent from the illustrative example.

Figure 1:
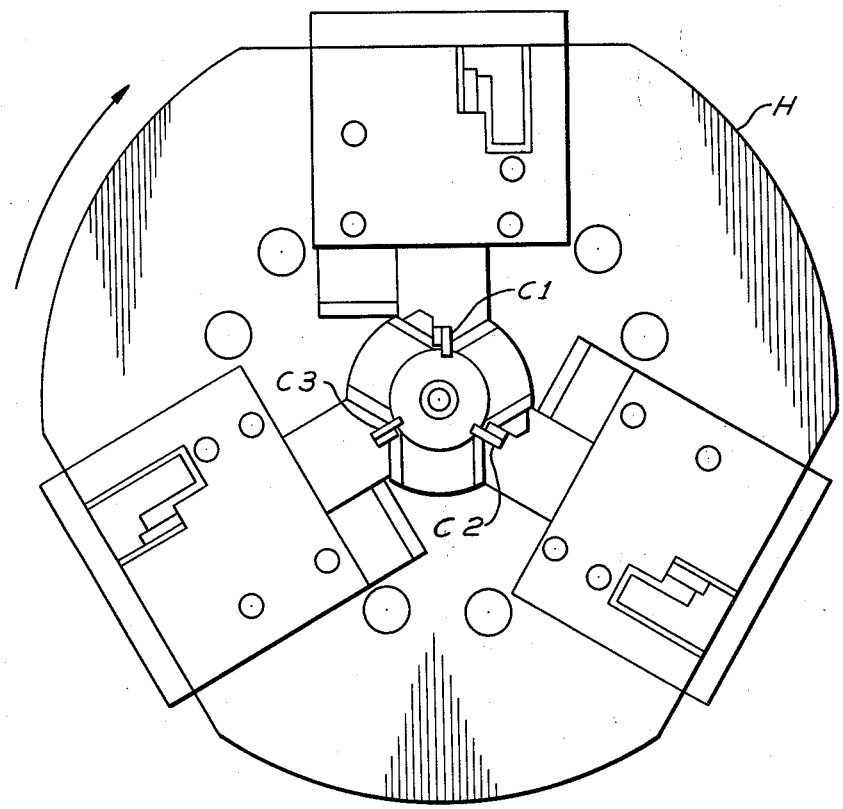
FIG. 1 is a front elevation of a rotary spindle head with a set of chasers of the present invention installed therein.
Figure 2:
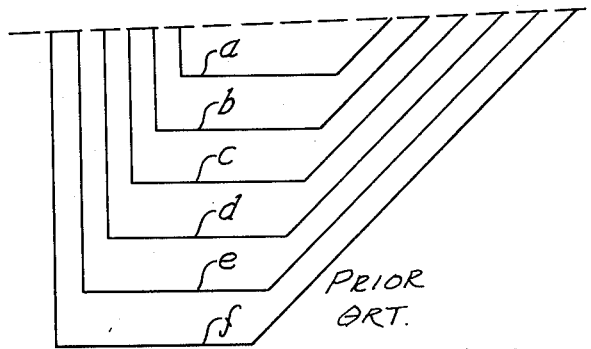
FIG. 2 is a diagrammatic illustration showing the cuts made in accordance with a prior method of cutting an external thread with a plurality of chasers co-rotatable about the thread axis.
Figure 4:
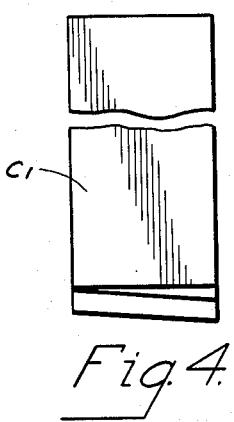
FIG. 4 is a left elevation of the first chasers illustrated in FIG. 3.
Figure 3:
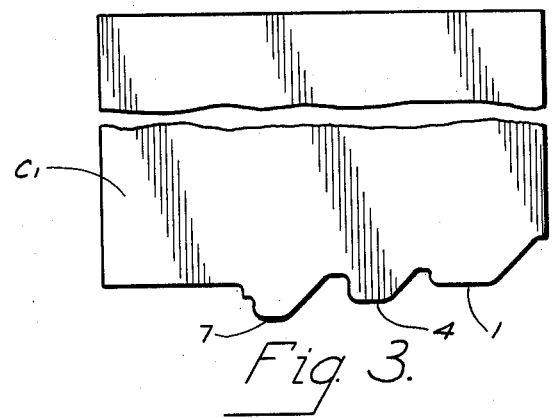
FIG. 3 is a front elevation of the forward face of the first chaser of a set of three chasers embodying the principles of the present invention, and showing the tooth profile thereof.
Figure 6:
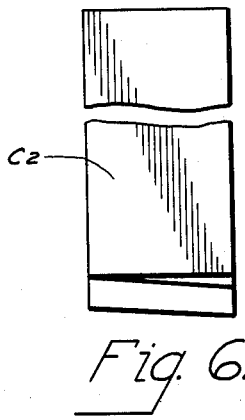
FIG. 6 is a left end elevation of the second chaser.
Figure 5:
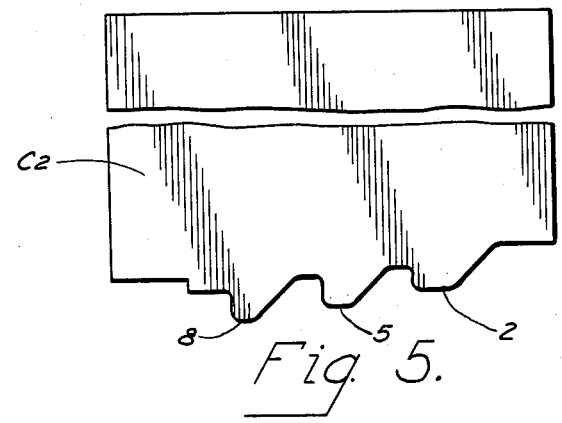
FIG. 5 is a front elevation of the forward face of the second chaser of the set.
Figure 8:
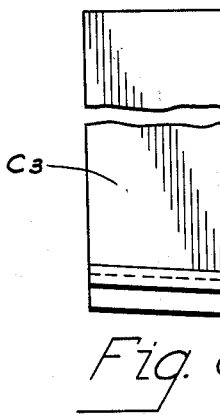
FIG. 8 is a left end elevation of the third chaser.
Figure 7:
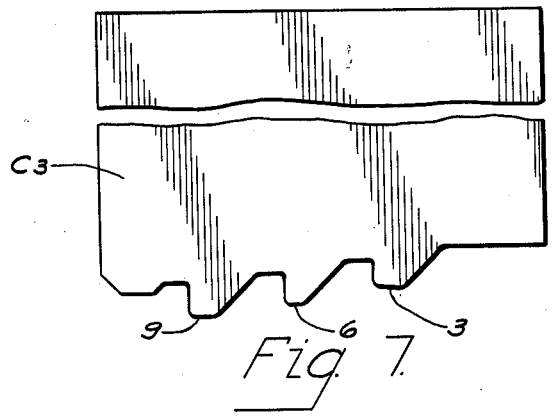
FIG. 7 is a front elevation of the forward face of the third chaser of the set.

Referring first to FIG. 1, the chasers are shown as mounted in a rotary spindle head H for cutting external threads. The head H may be of the type such as disclosed in United States Letters Patent No. 3,082,446, issued to William L. Benninghoff, March 26, 1963, and entitled Taper Thread Cutting Die Head With Radially Removable Wedge Elements for Controlling the Chasers, and No. 2,996,736, issued to William L. Benninghoff, August 22, 1961, and entitled Automatic Taper Thread Forming and Chamfer Cutting Machine.

The teeth are shown as embodied in a set of three chasers of three teeth each, their arrangement in other chasers being apparent from the illustrative example.

For comparison, there are illustrated diagrammatically the profiles of cuts made by a prior set of chasers, comprising three chasers of two teeth each, the profiles being taken on a radial plane through the axis of the thread. As therein illustrated, the cuts are six in number and indicated in order of cut as $a$ through $f$, inclusive. In this sequence of cuts it is to be noted that cut $a$ is a central cut, and cuts $b$ through $f$ are each a combination of a central cut and a concurrent cut on both flanks, the shear line of each cut being continuous from the outer surface of the workpiece along one flank to the trough, across the trough and along the other flank back to the outer surface of the workpiece.

This type of chaser has a number of disadvantages. Cut $a$ is generally free from trouble and trouble in cut $b$ is not intolerable, but there is combined a root cut and two flank cuts resulting in a tendency for chips from the root to move upwardly and outwardly from the axis, and those from the flanks to move inwardly. As a result the chips tend to pack in the spindle head adjacent the front face of the tooth. This tendency increases progressively for cuts $c$ through $f$, due both to the longer length of the root cut and the longer length of the flank cuts.

Further, as the shear line of each succeeding tooth becomes successively longer, the cutting load or stress becomes greater.

It is known that with high speed carbide chasers, each tooth must be working under a cutting resistance or load at all times along its cutting edge. Piling up of chips in front of a tooth tends to impede its cutting and results in dulling of the tooth rapidly. Also, the build-up of chips tends to increase greatly the power requirements for cutting. In order to eliminate these difficulties and to proportion the cuts so that no tooth is greatly overstressed by a combination of an excessively long shear line and the packing or loading of chips at its forward face, the chasers of the present invention are provided.

Referring to FIGS. 3 through 8, the set of chasers comprises three chasers of three teeth each, the chasers being designated in their order of cutting as $C_1$, $C_2$, and $C_3$, respectively. Each chaser is preferably a block of carbide of uniform thickness, sharpened in the somewhat conventional manner, as illustrated. The chasers, as a group, have teeth which, in their order of cutting, are indicated at 1 through 9, respectively, the distribution being teeth 1, 4, and 7 on chaser $C_1$, teeth 2, 5, and 8 on chaser $C_2$, and teeth 3, 6, 9 on chaser $C_3$.

Figure 9:
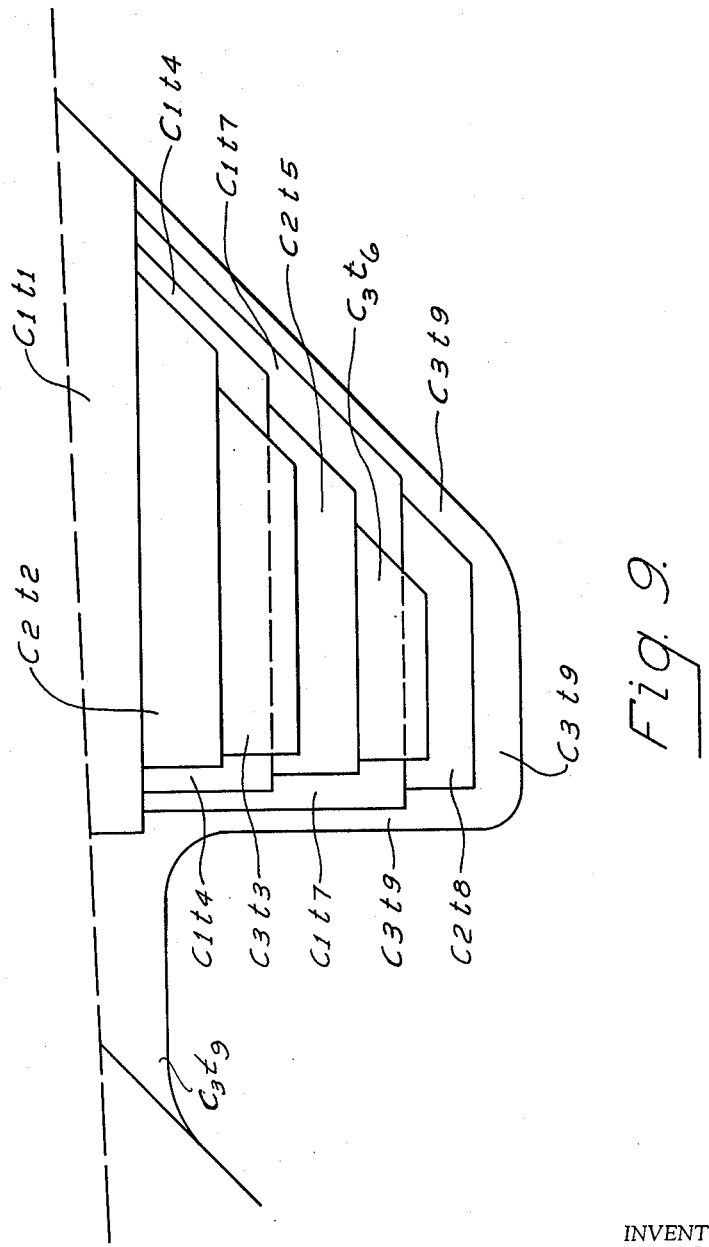
FIG. 9 is an enlarged fragmentary cross sectional view of two adjacent threads showing in assembled relation the cuts made by the various teeth of the chasers.

Referring to FIG. 9, the metal removed by the successive cuts are indicated by the lines designated by chaser number and by "$t$" followed by the tooth number. For example, the first cut is by $C_1t_1$, meaning chaser 1, tooth 1. Successive first cuts then are $C_2t_2$ and $C_3t_3$. These first cuts are followed by the successive second cuts by the second teeth of the chasers in succession in the following order: $C_1t_4$, $C_2t_5$, and $C_3t_6$. The next successive cuts in order are $C_1t_7$, $C_2t_8$, and $C_3t_9$. The individual cuts are shown in more detail in FIGS. 10A through 10I and are correspondingly indicated.

Referring to FIGS. 10A–10I, the metal removed by each cut is hatched. The cut $C_1t_1$ is a central cut and is by the first tooth 1 on the first chaser $C_1$. It is a cut of moderate depth but very long in the direction of lead of the thread. This cut presents not too great a problem as the extent of the tooth from its base to its crest is small and its flank ends 11 and 12 are widely spaced from each other. Hence there is adequate tooth strength and adequate chip space. The ends 11 and 12 are adjacent the finish flank lines, projected, of the adjacent teeth, but they are spaced outwardly from the finished root line beyond the crest line of the adjacent teeth.

The second cut $C_2t_2$, by the tooth 2, is a central cut and is considerably shorter in the lead direction than the cut $C_1t_1$. The flank ends 13 and 14 are inset in a direction endwise of the thread axis inwardly from the ends 11 and 12 of the preceding cut. Thus while the tooth 2 must be longer radially of the thread axis to extend between two adjacent thread flanks, its shortened dimension endwise of the axis and resultant reduced cut area tend to compensate, both in the cutting stress applied and in the reduction of chips and the resultant elimination of their packing.

The third cut $C_3t_3$ also is a central cut. It is made by tooth 3 and has its flank ends 15 and 16 stepped inwardly from the ends 13 and 14 of the preceding cut. Thus the longer dimension of tooth 3 from its base to its crest does not result in overstressing of the tooth at its base because the cut at its crest is proportionately less and imposes a smaller cutting stress. Also, there is ample space for chips to be free and unpacked so that they are easily flushed out by coolant.

The fourth cut $C_1t_4$ is an interrupted flank cut removing two flank portions 17 and 18. The outer flank ends 19 and 20 of these portions are inset from the flank ends 11 and 12 of the first cut $C_1t_1$. They do not extend to the finished flank lines of the thread. This cut does not impose a severe burden on its tooth 4 which has considerable length endwise of the thread axis so as to remove the two end areas 17 and 18, but the space between these areas is quite wide so that ample space for access of coolant to the tooth and for chip removal and escape is provided.

The fifth $C_2t_5$, made by tooth 5, is a central cut. It is shorter endwise of the axis than the preceding cut $C_1t_4$. It has flank ends 21 and 22 which are inset from the end portions 19 and 20 of the preceding cut $C_1t_4$. The sixth cut, $C_3t_6$, is a central cut made by tooth 6. It has ends 23 and 24 stepped inwardly from the ends 21 and 22 of the preceding cut $C_2t_5$. It is noted that the cut $C_3t_6$ is quite deep so that the tooth 6 must be of considerable length radially of the thread axis. However, due to the limited length of its cut endwise of the axis, the total cutting stress is limited and ample space is provided for the loose accommodation of chips and for free access of coolant.

The seventh cut, $C_1t_7$, made by tooth 7, is a flanking cut including portions 25 and 26 with outer flank ends 27 and 28, respectively, these flank ends being spaced from the finished shank line of the finished thread. Though considerable metal is removed by tooth 7 it is of considerable length endwise of the thread axis and therefore can be made adequately sturdy. Also, since chips are formed only at the flanks, the amount is small relative to the space for their escape.

The eighth or next to the last cut is $C_2t_8$ and is made by tooth 8. It is a central cut having flank ends 29 and 30 inset from the flank ends 27 and 28 of the preceding cut. Due to the space permitted by previous cuts, the tooth can be very rugged, and ample chip and coolant space is provided.

None of the final finished surfaces of the thread have been formed by the first eight cuts. In no case has any tooth been caused to drag across an already finished surface, nor has the finished surface of the final thread been subjected to scratching or abrasion by chips.

Finally, the last cut and finishing cut $C_3t_9$ is made by tooth 9. This tooth has a very long shear line with a heavy cut at one portion, indicated at 31 which, being near the base of the tooth, can readily be taken without overstressing the tooth. The cut is uninterrupted along the entire shear line from one crest of the thread, along the flanks and root, to the next adjacent crest. The flank portions 32 and 33 are widely spaced apart and relatively thin. Both the flank portions 32 and 33 and the central or root portion 34 are finishing cuts. The chips from the portion 34 tend to pass upwardly and those from the flank portions 32 and 33 tend to pass rearwardly toward the chips from the portion 34. However, the space between the portions 32 and 33 is such that chips therefrom, together with chips from the central portion 34, can readily be flushed out without scraping or damaging the finished thread surfaces.

For purposes of illustration, the invention is shown as applied to a thread having a 45° forward flank angle, a 0° rearward flank angle, and flat roots and crests, but the same principle, and sequence of cuts can be employed for other types of threads. Throughout the entire cutting operation, no surface formed by a preceding cut is scraped or burnished by rubbing contact with a surface of a tooth forming a successive cut. Instead, every cut is positive and the final finished surface of the tooth is not provided until the final cut is made. Chip packing is eliminated and effective access of coolant to the chasers is provided.

The sets of chasers herein are for cutting threads having a wide crest and wide root, as distinguished from conventional V-shaped threads which have relatively sharp crests and narrow roots, for instance, such as produced by the intersection of planar flanks at 60° to each other, and the words "wide crest, wide root" as used in the claims in referring to the threads are meant to exclude the conventional V-shaped threads, inasmuch as the problems in connection with the latter are totally different from those in connection with the "wide crest, wide root" type of thread.

Having thus described my invention, I claim:

A set of thread cutting chasers, said set consisting of a plurality of carbide chasers, each having cutting teeth, said chasers being adapted for mounting in a rotary spindle head in radially and circumferentially spaced relation to each other about the axis of rotation of the head for co-rotation of the chasers by the spindle head about said axis and for retraction and advancement relative to said axis concurrently with each other during the co-rotation and thereby rendered operative for high speed cutting on a cylindrical member, coaxial with the spindle head, of a tapered external spiral thread having a wide root and wide crest, the teeth of the chasers being arranged so that the successive teeth in the order enumerated along the cut being made are as follows:

1st, 2nd, and 3rd teeth which are progressively shorter, in a direction endwise of the thread axis, with the flanks of each inset from the corresponding flanks, respectively, of its predecessor, and which the progressively greater in height, radially of the thread axis, for making 1st, 2nd, and 3rd root cuts, respectively, with the flank ends of each root cut being stepped inwardly of the thread groove from the flank ends of the root cut immediately preceding it;

a 4th tooth which, endwise of the thread axis, is longer than the 2nd tooth and shorter than the 1st tooth and having its flanks stepped inwardly from the corresponding flanks of the 1st tooth, respectively, and stepped outwardly from the corresponding flanks of the 2nd and 3rd tooth, respectively, and which is of a radial height greater than that of the 2nd tooth but less than that of the 3rd tooth, for forming flank cuts on both flanks concurrently, interrupted by the preceding 2nd and 3rd root cuts;

a 5th tooth which, endwise of the thread axis, is shorter than the 4th tooth and longer than the 3rd tooth, with its flanks stepped inwardly from the corresponding flanks of the 4th tooth, and stepped outwardly from the corresponding flanks of the 3rd tooth, and which is of greater radial height than the 3rd tooth, for making a 4th root cut, with its flanks stepped inwardly from the corresponding flanks of the interrupted flank cut;

a 6th tooth which, endwise of the thread axis, is of less length than the 4th tooth and with its flanks stepped inwardly from the corresponding flanks of the 5th tooth, and which is of greater radial height than the 5th tooth, for making a 5th root cut, with its flanks stepped inwardly from the corresponding flanks of the 4th root cut;

a 7th tooth which, endwise of the thread axis, is longer than each of the 2nd through the 6th teeth, and shorter than the 1st tooth, with its flanks stepped inwardly from the corresponding flanks of the 1st tooth and stepped outwardly from the corresponding flanks of the 2nd tooth, and which is of greater radial height than the 5th tooth and of less radial height than the 6th tooth, for making a second interrupted flank cut on each flank spaced inwardly at both flanks from the corresponding flank cuts of the first root cut made by the 1st tooth;

an 8th tooth which, endwise of the thread axis, is shorter than the 7th tooth and with its flanks stepped inwardly from the corresponding flanks of the 7th tooth, and stepped outwardly from the corresponding flanks of the 6th tooth, for making a 6th root cut with its flanks stepped inwardly from the corresponding flanks of the second interrupted flank cut and which is of a radial height greater than the 6th tooth; and a 9th tooth which, endwise of the thread axis, is of greater length than the 1st tooth and having its forward flank stepped forwardly from the forward flank of the 7th tooth, its radial height greater than that of the 8th tooth, and its rear flank stepped rearwardly from the rear flank of the 7th tooth, and having a portion with a cutting edge extending rearwardly from the rear flank near the base of the 9th tooth in a direction generally endwise of the tooth axis, the cutting edge of the 9th tooth being uninterrupted and having the final contour in a radial plane through the thread axis, of the section of a finished thread in said plane, including the entire forward flank, the entire root, the entire rear flank, and the crest of the next adjacent thread at said rear flank.

References Cited in the file of this patent

UNITED STATES PATENTS

| | | |
|---|---|---|
| 1,610,087 | Hanson | Dec. 7, 1926 |
| 1,725,233 | Walker et al. | Aug. 20, 1929 |
| 1,950,704 | Thomson | Mar. 13, 1934 |
| 3,093,850 | Kelso | June 18, 1963 |

UNITED STATES PATENT OFFICE
CERTIFICATE OF CORRECTION

Patent No. 3,159,858 December 8, 1964

Donald O. Appleby

It is hereby certified that error appears in the above numbered patent requiring correction and that the said Letters Patent should read as corrected below.

Column 1, line 25, strike out "of the central cut"; line 33, after "of" insert -- the --; column 4, line 57, for "the" read -- are --.

Signed and sealed this 21st day of September 1965.

(SEAL)
Attest:

ERNEST W. SWIDER
Attesting Officer

EDWARD J. BRENNER
Commissioner of Patents